(12) United States Patent
Ripperger

(10) Patent No.: US 8,083,933 B2
(45) Date of Patent: Dec. 27, 2011

(54) PROCESS FOR REMOVING SULFUR FROM A FUEL GAS STREAM

(75) Inventor: Gary Lee Ripperger, Houston, TX (US)

(73) Assignee: Shell Oil Company, Houston, TX (US)

( * ) Notice: Subject to any disclaimer, the term of this patent is extended or adjusted under 35 U.S.C. 154(b) by 433 days.

(21) Appl. No.: 12/101,036

(22) Filed: Apr. 10, 2008

(65) Prior Publication Data

US 2008/0253949 A1 Oct. 16, 2008

Related U.S. Application Data

(60) Provisional application No. 60/911,422, filed on Apr. 13, 2007.

(51) Int. Cl.
*B01D 53/48* (2006.01)

(52) U.S. Cl. ............ 208/244; 208/208 R; 208/209; 208/211; 208/213; 208/216 R; 208/217; 208/243; 423/210; 423/242.1; 423/244.01; 423/244.02; 423/244.09; 423/244.1

(58) Field of Classification Search .......... 423/210, 423/242.1, 244.01, 244.02, 244.09, 244.1; 585/250, 271, 273–275; 95/235; 208/208 R, 208/209, 211, 213, 216 R, 217, 243–244
See application file for complete search history.

(56) References Cited

U.S. PATENT DOCUMENTS

| | | | | |
|---|---|---|---|---|
| 3,428,429 A | * | 2/1969 | Carson | 423/230 |
| 3,730,694 A | | 5/1973 | Wunderlich | 48/213 |
| 4,153,671 A | * | 5/1979 | Clements et al. | 423/244.02 |
| 5,401,391 A | | 3/1995 | Collins et al. | 208/208 R |
| 5,482,617 A | | 1/1996 | Collins et al. | 208/227 |
| 6,113,776 A | * | 9/2000 | Upson | 208/113 |
| 6,231,753 B1 | * | 5/2001 | McKnight et al. | 208/217 |
| 7,037,485 B1 | | 5/2006 | Drnevich et al. | 423/652 |
| 2006/0118465 A1 | | 6/2006 | de Lasa | 208/208 R |

FOREIGN PATENT DOCUMENTS

| | | |
|---|---|---|
| EP | 1690587 | 8/2006 |
| JP | 03033191 | 2/1991 |
| WO | WO2006013206 | 2/2006 |

OTHER PUBLICATIONS

Gary, J.H. et al. (2007). Petroleum Refining Technology and Economics, 5th edition, Taylor & Francis, 465 pgs (Office action cited pp. 141-142 & 170).*

* cited by examiner

*Primary Examiner* — Robert J Hill, Jr.
*Assistant Examiner* — Brian McCaig
(74) *Attorney, Agent, or Firm* — Charles W. Stewart

(57) ABSTRACT

A process for removing organic sulfur from a fuel gas stream that further contains light olefins by catalytic hydrodesulfurization to yield a treated fuel gas having an very low concentration of organic sulfur. The effluent of the catalytic hydrodesulfurization reactor may be cooled with a portion thereof being recycled and introduced along with the fuel gas stream that is charged to the hydrodesulfurization reactor. The remaining, unrecycled portion of the effluent may further be treated to remove the hydrogen sulfide that is yielded from by the hydrodesulfurization of the fuel gas stream.

5 Claims, 1 Drawing Sheet

PROCESS FOR REMOVING SULFUR FROM A FUEL GAS STREAM

Figure 1:
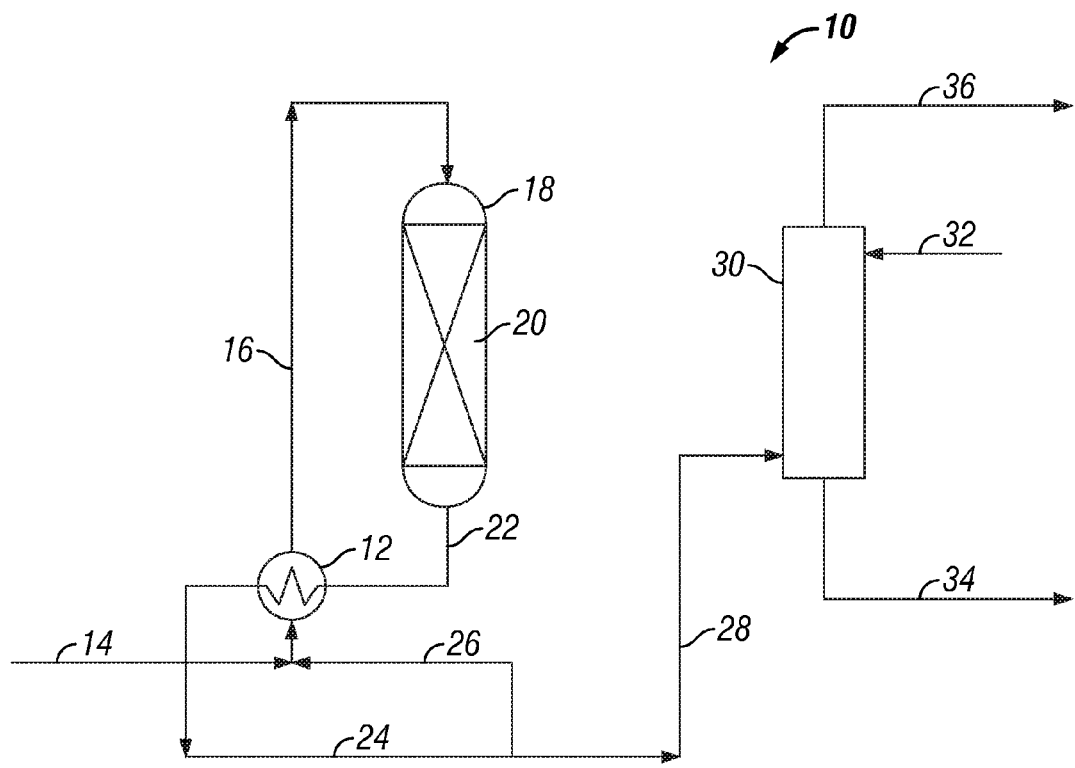

This application claims the benefit of U.S. Provisional Application No. 60/911,422 filed Apr. 13, 2007, the entire disclosure of which is hereby incorporated by reference.

The invention relates to a process for the removal of sulfur from a fuel gas stream.

There are presently federal regulations that impose certain maximum total sulfur concentration limits on refinery fuel gas streams and there is a trend in certain states and municipalities toward the imposition of even more stringent sulfur requirements for these streams. Among the various approaches that are useful in removing sulfur from refinery fuel gas streams to meet the sulfur regulations, caustic scrubbing and absorption methods are typically used. However, with the significantly lower limits that are being placed on the amount of total sulfur that may be contained within a refinery fuel gas stream, these methods tend to be unsuitable for providing treated refinery fuel gas streams that meet the lower sulfur concentration requirements. Certain of the refinery fuel gas streams such as a coker unit dry gas or a fluid catalytic cracking unit gas can contain concentrations of carbonyl sulfide (COS) and other sulfur compounds that are difficult to acceptably be removed therefrom by traditional caustic or absorption scrubbing and other methods to the lower sulfur concentration levels required by the newer regulations.

An alternative to the use of caustic or absorption scrubbing of sulfur from natural gas streams is the process that is disclosed in WO 2006/013206 for the removal of mercaptan compounds from a natural gas stream by contacting the natural gas stream with a hydrodesulfurization catalyst in the presence of hydrogen to yield a treated natural gas stream that is depleted of mercaptans and enriched with hydrogen sulfide. Hydrogen sulfide is removed from the treated natural gas stream to provide a purified natural gas stream. The hydrodesulfurization catalyst may comprise a Group VIII (e.g. cobalt and nickel) metal and a Group VIB (e.g. molybdenum and tungsten) metal placed on a support such as alumina, titania, silica, zirconia, and silica-alumina. The natural gas of the natural gas stream is mainly methane, but it further can comprise lower alkanes such as ethane, propane, butane, and pentane, and, if the natural gas stream contains an inert gas, it is preferred for it to not contain a synthesis gas due to it being reactive in the presence of the hydrodesulfurization catalyst.

It is recognized that the process of publication WO 2006/013206 is directed to the removal of mercaptan compounds from natural gas that, typically, primarily contains lower alkane hydrocarbons with no significant concentrations of olefin compounds or aromatic and other sulfur compounds. It is also significant to note that this publication indicates a preference for the treatment of a natural gas stream that does not contain a synthesis gas due to it being reactive in the presence of the hydrodesulfurization catalyst of the process.

U.S. patent application Ser. No. 11/659,059 is the US national phase filing of International Application No. PCT/EP2005/053770 (WO 2006/013206) and is incorporated herein by reference.

Another of the attributes of several of the refinery fuel gas streams, such as the aforementioned coker dry gas and fluid catalytic cracking fuel gas streams, in addition to the particular types and amounts of sulfur compounds that are present therein, is that they can contain significant concentrations of lower olefins, such as ethylene, propylene and butylenes. The presence of these lower olefins makes the hydrotreating of refinery fuel gas streams difficult due to problems related to the handling of the exotherm and fouling that result from the saturation of the olefin bonds and, in general, just controlling the chemistry of the olefin saturation. But, furthermore, traditionally, there has been no need to use such a severe desulfurization technique; because, before the imposition of the aforementioned lowered refinery fuel gas sulfur concentration requirements, the traditional caustic or absorption scrubbing methods have been suitable.

It is, thus, desirable to have a process that can suitably treat a gas stream having a significant concentration of difficult to remove sulfur compounds to yield a treated gas stream with a significantly reduced concentration of sulfur.

It is also desirable to have a process for treating a refinery fuel gas stream that contains a significant concentration of lower olefins and sulfur compounds in order to provide a treated refinery fuel gas stream having a significantly reduced sulfur concentration.

Accordingly, provided is a process for removing sulfur from a fuel gas stream that comprises an organic sulfur compound and a light olefin, wherein said process comprises: introducing said fuel gas stream into a reactor containing an HDS catalyst wherein said fuel gas stream is contacted under hydrodesulfurization process conditions with said HDS catalyst; and yielding from said reactor a reactor effluent containing $H_2S$ and a significantly reduced organic sulfur concentration that is below the organic sulfur concentration of said fuel gas stream.

FIG. 1 is a process flow schematic that presents one or more embodiments of the inventive process for removing sulfur from a fuel gas stream to yield a treated fuel gas stream having a low sulfur concentration.

In certain regulatory situations refinery fuel gas streams are required to meet maximum sulfur content limits before they may be combusted. These sulfur concentration limits are progressively being lowered as regulatory agencies impose stricter standards upon refineries. In the case of refinery fuel gas streams, in some geographic areas the required sulfur concentration limits are being reduced considerably. These reductions require the processing of the various refinery fuel gas streams in order to remove significant quantities of sulfur compounds that can be difficult to remove by the traditional methods. The inventive process resolves some of the aforementioned problems associated with the hydrotreating of certain refinery fuel gas streams and provides for the removal of sulfur from a refinery fuel gas stream that comprises a concentration of a light olefin compound as well as an organic sulfur compound.

The refinery fuel gas stream of the inventive process can include a single stream or a combination of two or more of the streams that are yielded from any of the numerous process units of a crude oil refinery. Of particular interest are the gas streams generated by a delayed coker unit, such as the coker dry gas and coker propylene vapor, a fluid catalytic cracking unit, such as the FCC dry gas, a flare gas recovery system, tank vents, and vapor overheads from crude unit atmospheric and vacuum towers. The gas streams yielded from these process units can have significant concentrations of sulfur compounds, including those which can be difficult to remove by the use of conventional methods, particularly, to the significantly lower concentration levels as required by the aforementioned new sulfur regulations.

An additional characteristic of these refinery fuel gas streams is that they can include significant concentration levels of light or lower olefin compounds, such as ethylene, propylene, butenes and pentenes. More typically, the lower olefin compound contained in the refinery fuel gas stream of the inventive process include those selected from the group consisting of ethylene, propylene, butylenes and any combination thereof. The presence of these olefins have normally not posed a problem with the application of traditional sulfur removal methods, but as will be further noted later, prior to the invention as described herein, the presence of the olefins would have generally prevented one skilled in the art from considering the application of hydrodesulfurization methods to treat the fuel gas streams that contain such olefins.

The fuel gas stream of the inventive process can contain a concentration of at least one sulfur compound and a concentration of at least one light olefin. The sulfur compounds that can be present in the fuel gas stream can include organic sulfur compounds that include thiol compounds, thiophene compounds, disulfide compounds and carbonyl sulfide. The thiol compounds can include one or more of the various aliphatic mercaptans, such as, for example, methyl mercaptan, ethyl mercaptan, propyl mercaptan, butyl mercaptan, and amyl mercaptan, and aromatic mercaptans, such as, for example, phenyl mercaptan. The thiopheneic compounds can include thiophene and any of the benzothiophenes and substituted thiophenes.

The concentration of the mercaptans in the fuel gas stream is generally in the range upwardly to 5000 ppmv (0.5 volume percent of the fuel gas stream). But, for the inventive process, the mercaptan concentration in the fuel gas stream to be treated will, typically, be more than 20 ppmv and in the range of from 20 ppmv to 3000 ppmv. More typically, the mercaptan concentration is in the range of from 40 ppmv to 2000 ppmv, and, most typically, from 45 ppmv to 1500 ppmv.

The organic sulfur compounds that include thiophenes, organic disulfides and carbonyl sulfide are the more difficult compounds to remove from a fuel gas stream by use of conventional sulfur removal methods. The concentration of the these organic sulfur compounds in the fuel gas stream of the inventive process can, collectively, be in the range of from 1 ppmv to 500 ppmv, but, typically, the collective concentration of these organic sulfur compounds will be in the range of from 2 to 300 ppmv, and, more typically, from 3 to 200 ppmv. The specific concentration of the carbonyl sulfide in the fuel gas stream can be upwardly to 500 ppmv, and, more typically, from 1 to 300 ppmv.

The total concentration of all the organic sulfur compounds, including thiol compounds, thiophene compounds, disulfide compounds and carbonyl sulfide, contained in the fuel gas stream of the inventive process is, typically, in the range of from 40 ppmv to 5000 ppmv. More typically, the total concentration of all the organic sulfur compounds contained in the fuel gas stream to be treated is in the range of from 45 ppmv to 3000 ppmv, and, most typically, from 50 ppmv to 2000 ppmv.

As for the concentration of light olefins of the fuel gas stream to be treated by the inventive process, it can, depending upon the particular source or sources of the fuel gas streams, be in the range upwardly to 50 volume percent (%) of the fuel gas stream. For instance, an FCC dry gas will contain significantly higher quantities of light olefins as compared to fuel gas streams from other sources, but, typically, the light olefin concentration of the fuel gas stream of the inventive process will be in the range of from 0.1 vol % to 45 vol %, more typically, from 0.5 vol % to 40 vol %, and, most typically, from 1 vol % to 30 vol %.

In the inventive process, the fuel gas stream is introduced into a hydrodesulfurization (HDS) reactor that contains a hydrodesulfurization (HDS) catalyst wherein it is contacted with the HDS catalyst under suitable hydrodesulfurization process conditions so as to convert the sulfur compounds that are contained within the fuel gas stream to hydrogen sulfide. This hydrodesulfurization step provides for the conversion and ultimate removal of the difficult sulfur compounds contained in the fuel gas stream. Prior to the implementation of the more stringent sulfur regulations for refinery fuel gas, as referenced above, there was no need to remove these difficult sulfur compounds; because, their presence typically was in small enough concentration levels as not to require their removal. Thus, one skilled in the art would not have been motivated to use such a hydrodesulfurization reaction to remove sulfur from a refinery fuel gas stream.

Also, as mentioned earlier, another difficulty with the hydrotreating of a refinery fuel gas stream is that the presence of large concentrations of light olefins in the refinery fuel gas stream would be anticipated to release so much heat upon their hydrogenation that it would be difficult to hydrodesulfurize the refinery fuel gas stream. Also, the typical application of hydrodesulfurization is in the desulfurization of liquid hydrocarbons that contain organic sulfur species that are converted to hydrogen sulfide. The hydrogen sulfide is then, generally, by use of a stripping step removed along with the other gaseous components that are yielded from the hydrodesulfurization reaction step. One would not contemplate the need to convert gaseous organic sulfur compounds that are contained in a refinery fuel gas stream to hydrogen sulfide that would then remain in the hydrotreated fuel gas stream that is further treated using conventional absorption methods.

The hydrodesulfurization ("HDS") catalyst of the invention can be any suitable hydrogenation catalyst including conventional hydrodesulfurization catalysts that comprise a metal component on a support material. The metal component can include a Group VIB metal component or a Group VIII metal component, or both metal components. It is preferred for the hydrodesulfurization catalyst to comprise both a Group VIB metal component and a Group VIII metal component. The hydrodesulfurization catalyst can also include a promoter such as a phosphorous component.

The Group VIII metal component of the hydrodesulfurization catalyst composition is selected from those Group VIII metal or metal compounds that, in combination with the other components of the catalyst composition, suitably provide a hydrodesulfurization catalyst. The Group VIII metal can be selected from the group consisting of nickel, cobalt, palladium and platinum. Preferably, the Group VIII metal is either nickel or cobalt and, most preferably, the Group VIII metal is cobalt.

The Group VIII metal component contained in the hydrodesulfurization catalyst composition can be in the elemental form or in the form of a metal compound, such as, for example, oxides, sulfides and the like. The amount of Group VIII metal in the hydrodesulfurization catalyst composition can be in the range of from about 0.1 to about 6 weight percent elemental metal based on the total weight of the hydrodesulfurization catalyst composition. Preferably, the concentration of Group VIII metal in the hydrodesulfurization catalyst composition is in the range of from 0.3 weight % to 5 weight %, and, most preferably, the concentration is in the range of from 0.5 weight % to 4 weight %.

The Group VIB metal component of the hydrodesulfurization catalyst composition is selected from those Group VIB metal or metal compounds that, in combination with the other elements of the hydrodesulfurization catalyst composition, suitably provide a hydrodesulfurization catalyst. The Group VIB metal can be selected from the group consisting of chromium, molybdenum and tungsten. The preferred Group VIB metal is either molybdenum or chromium and, most preferred, it is molybdenum.

The Group VIB metal component contained in the hydrodesulfurization catalyst composition can be in the elemental form or in the form of a metal compound, such as, for example, oxides, sulfides and the like. The amount of Group VIB metal in the hydrodesulfurization catalyst composition can be in the range of from about 5 to about 25 weight percent elemental metal based on the total weight of the hydrodesulfurization catalyst composition. Preferably, the concentration of Group VIB metal in the hydrodesulfurization catalyst composition is in the range of from 6 weight % to 15 weight %, and, most preferably, the concentration is in the range of from 7 weight % to 12 weight %.

The support material of the hydrodesulfurization catalyst can be any material that suitably provides a support for the metal hydrogenation components of the hydrodesulfurization catalyst including porous refractory oxides. Examples of possible suitable porous refractory oxides include silica, magnesia, silica-titania, zirconia, silica-zirconia, titania, titania-alumina, zirconia-alumina, silica-titania, alumina, silica-alumina, and alumino-silicate. The alumina can be of various forms, such as, alpha alumina, beta alumina, gamma alumina, delta alumina, eta alumina, theta alumina, boehmite, or mixtures thereof. The preferred porous refractory oxide is amorphous alumina. Among the available amorphous aluminas, gamma alumina is most preferred.

The porous refractory oxide generally has an average pore diameter in the range of from about 30 Angstroms to about 500 Angstroms, preferably, from 50 Angstroms to 400 Angstroms, and, most preferably, from 70 Angstroms to 300 Angstroms. The total pore volume of the porous refractory oxide, as measured by standard mercury porisimetry methods, is in the range of from about 0.2 cc/gram to about 2 cc/gram. Preferably, the pore volume is in the range of from 0.3 cc/gram to 1.5 cc/gram, and, most preferably, from 0.4 cc/gram to 1 cc/gram. The surface area of the porous refractory oxide, as measured by the B.E.T. method, generally exceeds about 100 $m^2$/gram, and it is typically in the range of from about 100 to about 400 $m^2$/gram.

The reactor effluent that is yielded from the reactor contains hydrogen sulfide that is produced by the hydrogenation of the organic sulfur compounds contained in the refinery fuel gas stream that is contacted with the HDS catalyst under hydrodesulfurization process conditions. The concentration of the organic sulfur compounds in the reactor effluent, thus, is significantly below the concentration of organic sulfur compounds that is in the fuel gas stream charged to the reactor.

It is desirable for the concentration of organic sulfur compounds in the reactor effluent to be significantly reduced below that of the fuel gas stream such that it is less than 40 ppmv, and, preferably, the significantly reduce organic sulfur concentration of the reactor effluent is less than 35 ppmv. More preferably, the organic sulfur concentration of the reactor effluent is less than 30 ppmv, and, most preferably, less than 20 ppmv or even less than 10 ppmv. While it is recognized that there are practical limits as to how low the organic sulfur concentration of the fuel gas stream may be reduced, it is desirable to reduce the organic sulfur concentration to as low as is feasible.

The hydrodesulfurization process conditions include the contacting of the fuel gas stream in the presence of hydrogen contained therein, including, if required, added hydrogen, with the HDS catalyst under temperature, pressure and flow conditions suitable for promoting the hydroconversion of the organic sulfur compounds of the fuel gas stream to hydrogen sulfide. The contacting temperature should be in the range of from 150° C. (302° F.) to 480° C. (896° F.), preferably, from 200° C. (392° F.) to 430° C. (806° F.), and, most preferably, from 230° C. (446° F.) to 340° C. (644° F.). As for the contacting pressure, it should be in the range of from 75 psig to 600 psig, preferably, from 100 psig to 500 psig, and, most preferably, from 125 psig to 400 psig.

The flow rate at which the fuel gas stream is charged to the reactor of the inventive process is generally such as to provide a gaseous hourly space velocity (GHSV) in the range of from 0.01 $hr^{-1}$ to 1000 $hr^{-1}$. The term "gaseous hourly space velocity", as used herein, means the numerical ratio of the rate at which the fuel gas stream, including added hydrogen, if any, is charged to the reactor in volume (at standard temperature and pressure conditions) per hour divided by the volume of HDS catalyst contained in the reactor to which the fuel gas stream is charged. The preferred GHSV is in the range of from 0.05 $hr^{-1}$ to 500 $hr^{-1}$, more preferably, from 0.1 $hr^{-1}$ to 300 $hr^{-1}$, and, most preferably, from 0.2 $hr^{-1}$ to 200 $hr^{-1}$.

Because the refinery fuel gas stream has a significantly large concentration of light olefins, the catalytic hydrodesulfurization thereof can result in a large amount of heat that is released by the hydrogenation of the olefins. This heat release can cause a large temperature increase across the HDS catalyst bed of the reactor thereby providing a reactor effluent having a temperature above that of the refinery fuel gas stream to be introduced into the reactor. It, thus, can be desirable to cool the reactor effluent by any suitable means known to those skilled in the art to thereby provide a cooled reactor effluent. It is preferable to recover a portion of the heat that is released by the hydrodesulfurization reaction and contained in the reactor effluent by exchanging the heat energy contained therein with at least a portion of the refinery fuel gas stream that is to be charged to the reactor. To do this, heat exchange means for exchanging heat energy between at least a portion of the refinery fuel gas stream and at least a portion of the reactor effluent is utilized to cool the reactor effluent and heat the refinery fuel gas stream prior to introducing it into the reactor.

In a further embodiment of the inventive process, a feature is provided to address certain of the problems that are associated with the hydrodesulfurization of the refinery fuel gas stream that contains a high concentration of light olefins and the associated high heat release. It has been determined that the use or recycling of a portion of the cooled reactor effluent to be combined with the refinery fuel gas stream that is charged to the reactor can provide for better control of the temperature across the reactor. This benefit is believed to result from using as a recycle stream the reactor effluent that contains essentially no reactive compounds due to it already being subjected to the hydrotreating reaction and simply using the recycle stream as a diluent of the reactor feed. The amount of recycle can be adjusted to allow for the control and limitation of the temperature increase across the HDS catalyst bed.

The remaining portion of the cooled reactor effluent that is not recycled to the reactor can be further treated to remove the hydrogen sulfide contained therein in order to provide a treated fuel gas having a reduced concentration of $H_2S$. Any suitable means or method may be used to reduce the hydrogen sulfide content of the remaining portion of the cooled reactor effluent as long as it is capable of providing a treated fuel gas stream having a concentration of $H_2S$ of less than 40 ppmv of $H_2S$, preferably, less than 20 ppmv of $H_2S$, and, most preferably, less than 10 ppmv of $H_2S$. This reduced concentration of $H_2S$ provides a treated fuel gas that will meet most of the new, more stringent sulfur regulations and that has a suitably low $H_2S$ concentration such that it may be combusted or burned in the typical combustion devices or means for combusting or burning a treated fuel gas of a plant, such as, for example, the burners that are used in refinery heaters, furnaces, flares and other equipment.

A preferred method of treating the remaining portion of the cooled reactor effluent to remove the $H_2S$ is to use traditional absorption scrubbing of the gas stream to remove the $H_2S$ contained therein. This is done by contacting the remaining portion of the cooled reactor effluent with a suitable absorbent and yielding a treated fuel gas having a reduced concentration of $H_2S$ and the absorbent that is rich in $H_2S$. Among the absorption processes that may suitably be used to treat the remaining portion of the cooled reactor effluent, amine treating is preferred. Amine treating includes the use of any known amine absorbents such as, for example, monoethanolamine (MEA), diethanolamine (DEA), methyldiethanolamine (MDEA), diisopropylamine (DIPA), and diglycolamine (DGA).

Reference is now made to the process flow schematic of FIG. 1, which includes for illustrative purposes various embodiments of the inventive process. Depicted in FIG. 1 is a fuel gas treating process 10. A refinery fuel gas stream is passed to a feed/effluent heat exchanger 12 of the fuel gas treating process 10 through conduit 14. The feed/effluent heat exchanger 12 provides for a heated fuel gas stream that passes from the feed/effluent heat exchanger 12 by way of conduit 16 and is introduced into reactor 18 that includes a bed 20 of HDS catalyst. The reactor 18 is operated under suitable hydrodesulfurization process conditions in order to convert the organic sulfur compounds contained in the refinery fuel gas stream to hydrogen sulfide.

The reactor effluent that is yielded from the reactor 18 has a much reduced concentration of organic sulfur as compared to the organic sulfur concentration of the refinery fuel gas stream. The reactor effluent passes from the reactor 18 by way of conduit 22 to the feed/effluent heat exchanger 12 that provides for cooling of the reactor effluent and heating of the refinery fuel gas stream by the indirect heat exchange between the two streams. The cooled reactor effluent passes from the feed/effluent heat exchanger 12 by way of conduit 24.

A portion of the cooled reactor effluent may be used as a recycle stream that passes by way of conduit 26 to be mixed with the refinery fuel gas stream of conduit 14, or, alternatively, with the heated refinery fuel gas stream of conduit 16, whereby it is introduced into the reactor 18 along with the heated refinery fuel gas stream. The remaining portion of the cooled reactor effluent that is not recycled passes by way of conduit 28 to an absorption unit 30.

The absorption unit 30 provides for the removal of hydrogen sulfide that is contained in the remaining portion of the cooled reactor effluent by contacting it with a suitable absorbent fluid. A lean absorbent fluid is introduced to the absorption unit 30 through conduit 32 and a rich absorbent fluid containing hydrogen sulfide that is removed from the remaining portion of the cooled reactor effluent passes from the absorption unit 30 by way of conduit 34. A treated fuel gas having a significantly reduce concentration of hydrogen sulfide passes from the absorption unit 30 by way of conduit 36 to any suitable combustion device or means for burning or combusting the treated fuel gas, such as, for example, burners that are used in refinery heaters, furnaces, flares and other equipment.

That which is claimed is:

1. A process for removing sulfur from a fuel gas stream that comprises at least one organic sulfur compound selected from the group consisting of thiol compounds, thiophene compounds, disulfide compounds, carbonyl sulfide, and mixtures thereof, wherein the total concentration of said at least one organic sulfur compound is in the range of from 40 ppmv to 5000 ppmv, a light olefin concentration, and a concentration of mercaptans, wherein said process comprises:

introducing said fuel gas stream into a reactor containing an HDS catalyst, wherein said HDS catalyst comprises an inorganic oxide and an active hydrogenation metal component, wherein the metal of said active hydrogenation metal component is selected from the group of metals consisting of cobalt, nickel, chromium, molybdenum, and tungsten, and wherein said fuel gas stream is contacted under hydrodesulfurization process conditions with said HDS catalyst;

yielding from said reactor a reactor effluent containing $H_2S$ and a significantly reduced organic sulfur concentration that is less than 40 ppmv;

cooling said reactor effluent by exchanging heat energy between at least a portion of said fuel gas stream and at least a portion of said reactor effluent by use of an heat exchanger to provide a cooled reactor effluent prior to said introducing of said fuel gas stream that includes said at least a portion of said fuel gas stream into said reactor;

recycling a portion of said cooled reactor effluent and introducing it with the introduction of said fuel gas stream into said reactor; and passing a remaining portion of said cooled reactor effluent to an absorption unit whereby said remaining portion of said cooled reactor effluent is treated to remove $H_2S$ therefrom and to yield a treated fuel gas having a reduced concentration of $H_2S$ of less than 40 ppmw.

2. A process as recited in claim 1, wherein said mercaptans are selected from the group consisting of methyl mercaptan, ethyl mercaptan, propyl mercaptan, butyl mercaptan, and amyl mercaptan; and wherein said light olefin is selected from the group consisting of ethylene, propylene and butylenes.

3. A process as recited in claim 2, wherein said active hydrogenation metal compound includes cobalt or nickel present in said HDS catalyst in an amount in the range of from about 0.1 to about 6 weight percent on an elemental basis and based on the total weight of said HDS catalyst and molybdenum or tungsten present in said HDS catalyst in an amount in the range of from about 5 to about 25 weight percent on an elemental basis and based on the total weight of said HDS catalyst.

4. A process as recited in claim 3, wherein said hydrodesulfurization process conditions include a contacting temperature in the range of from 150° C. to 480° C., a contacting pressure in the range of from 75 psig to 600 psig, and a GHSV in the range of from 0.01 $hr^{-1}$ to 1000 $hr^{-1}$.

5. A process as recited in claim 4, wherein said light olefin concentration is in the range of from 0.1 vol % to 45 vol %, said concentration of mercaptans is in the range of from 20 ppmv to 3000 ppmv, said significantly reduced organic sulfur concentration is less than 30 ppmv, and said reduce concentration of $H_2S$ is less than 20 ppmv.

* * * * *